United States Patent
Kanno (10) Patent No.: US 6,329,765 B1
(45) Date of Patent: Dec. 11, 2001

(54) DEVICE FOR LIGHTING FILAMENT LAMP

(75) Inventor: Takayuki Kanno, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,597

(22) PCT Filed: Sep. 22, 1999

(86) PCT No.: PCT/JP99/05186

§ 371 Date: May 26, 2000

§ 102(e) Date: May 26, 2000

(87) PCT Pub. No.: WO00/19777

PCT Pub. Date: Apr. 6, 2000

(30) Foreign Application Priority Data

Sep. 28, 1998 (JP) .................................. 10-273342

(51) Int. Cl.$^7$ .................................. H05B 37/02
(52) U.S. Cl. .................. 315/291; 315/224; 315/324
(58) Field of Search .................. 315/307, 291, 315/224, 308, 312, 318, 324, 292–295

(56) References Cited

U.S. PATENT DOCUMENTS 5,621,281 * 4/1997 Kawabata et al. .................. 315/307
6,137,239 * 10/2000 Wu et al. .................. 315/291

FOREIGN PATENT DOCUMENTS

| | | |
|---|---|---|
| 2-66889 | 3/1990 | (JP) . |
| 4-126393 | 4/1992 | (JP) . |
| 8-45863 | 2/1996 | (JP) . |
| 8-162257 | 6/1996 | (JP) . |
| 8-172770 | 7/1996 | (JP) . |

* cited by examiner

Primary Examiner—Don Wong
Assistant Examiner—Wilson Lee
(74) Attorney, Agent, or Firm—Nixon Peabody LLP; David S. Safran

(57) ABSTRACT

To eliminate the effect of high-frequency distortion on the power supply side in filament lamp lighting devices that perform light adjustment of multiple filament lamps. In a filament lamp lighting device that has an alternating current power supply connected to the input side and lights multiple filament lamps by controlling its output power, in Lamp lighting control circuits 2-1 through 2-n are established to respond to multiple filament lamps 4-1 through 4-n. When their switching elements are ON, these lighting control circuits 2-1 through 2-n supply input current to the filament lamps 4-1 through 4n; when the switching element is OFF, current continuous to flow to the filament lamp by means of energy stored in an inductance L. Subsequent alternation of the ON and OFF states supplies the filament lamp with output current with roughly the same shape as the input current waveform.

Moreover the controller 3, by varying the duty cycle of the ON/OFF signals of the switching elements, varies the peak values of the output current and also provides the lighting control circuits 2-1 through 2-n with ON/OFF signals having staggered timing.

1 Claim, 10 Drawing Sheets

FIG.10(a)
input voltage

FIG.10(b)
gate current

FIG.10(c)
output current
(output voltage)

FIG.11(a)
input voltage

FIG.11(b)
gate current

FIG.11(c)
output current
(output voltage)

DEVICE FOR LIGHTING FILAMENT LAMP

FIELD OF TECHNOLOGY

This invention concerns a filament lamp lighting device for such uses as general lighting or heat: treatment equipment. In more detail, it concerns a filament lamp lighting device that connects to the filament lamp on the output side and controls the output power.

BACKGROUND OF TECHNOLOGY

Filament lamp lighting devices are widely used for heat treatment and general lighting. Light irradiation heat treatment equipment for semiconductor wafers (hereafter wafers) can be cited as one application of filament lamp lighting devices to heat treatment.

Heat treatment is used in the process of semiconductor manufacturing for rapidly heating wafers, maintaining them at a high temperature, and rapid cooling. It is carried out in a broad range of processes such as film formation, diffusion and annealing.

In all the above processes, the wafer is treated at a high temperature, and when this heat treatment is done using light irradiation heat treatment equipment, the wafer can be heated rapidly, exceeding 1000° C. in 10 to 30 seconds. And when the light irradiation is stopped, rapid cooling is possible.

However, if the temperature distribution of the wafer is uneven when the wafer is heated, the phenomenon known as slip occurs in the wafer. In other words, defects occur in the crystal dislocation, and poor quality products are liable to result.

Therefore, when using light irradiation heat treatment equipment for heat treatment of wafers, it is necessary that the heating, temperature maintenance and cooling of the wafer be done with uniform temperature distribution.

Light irradiation heat treatment equipment intended to irradiate so that the temperature distribution of the wafer will be uniform includes, for example, that presented in JPO kokai patent report H8-45863. The light source of the light irradiation heat treatment equipment described in that report had a number of ring-shaped infrared lamps of different diameters arranged in concentric circles. By arranging the lights in that way, the wafer could be divided into concentric zones, and temperature control was simplified.

To make the temperature of the wafer uniform, the temperature of each zone of the wafer was measured and the heat generated by the infrared lamp corresponding to each zone was controlled accordingly. That is, if the temperature were lower at the periphery of the wafer, the input power to the lamp covering the center of the wafer would be increased, and the amount of heat generated by the lamp would go up and apply more heat to the wafer. The variation of the heat generated by the lamp is referred to below as "light adjustment."

Halogen lamps with filaments that radiate infrared light efficiently are generally used as the infrared lamps in light irradiation heat treatment equipment. Moreover, an alternating current power supply is generally used as the lighting power supply.

Light adjustment of filament lamps is done in the following way.

(1) For light adjustment of a filament lamp in a general lighting fixture, a circuit with a triac is normally used, and adjustment is done by controlling the continuity angle of the triac.

Figure 9:
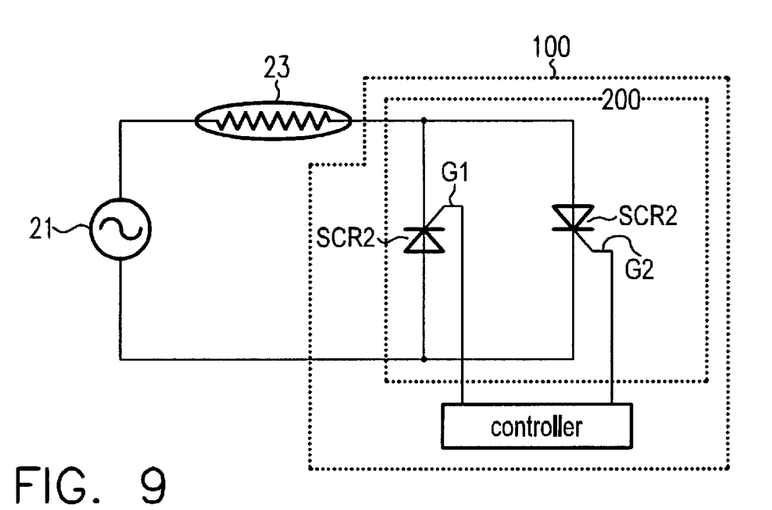
FIG. 9 is a diagram showing an example of the basic structure of an lamp lighting device using thyristors.

(2) Light adjustment of light irradiation heat treatment equipment basically applies the same circuit, and so a thyristor is used. The basic structure of lamp lighting device using thyristors is shown in FIG. 9. Now, one lamp lighting device is used for a single lamp. Consequently, in equipment to control the lighting of multiple lamps, the number of lamp lighting devices depends on the number of lamps. The devices are housed on the equipment power supply box.

In the lighting device shown in FIG. 9, control of the power input to the lamp, or light adjustment, is done by varying the timing of the gate current of thyristors SCR1 and SCR2.

Power control by thyristor is done by two methods, continuity angle control and zero cross control. Now, terminology is defined below. Input power from a commercial alternating current power supply to the lamp lighting device is called "input." The power output from the lamp lighting device to the lamp is called "output." Accordingly, "output power" is "lamp input power."

(a) Continuity Angle Control

In FIG. 9, alternating current from a commercial alternating current power supply 21 is input to the lamp lighting device 100. Within the lamp lighting device 100 is a lamp lighting control circuit 200 that comprises the first thyristor SCR1 and the second thyristor SCR2. When the gate signal generated by the gate signal generation circuit of the controller 300 lets the gate current flow to the gates G1, G2 of the thyristors SCR1, SCR2 of the lamp lighting control circuit 200, then current is output from the lamp lighting device 100 to the lamp 23 until the current supplied to the thyristors SCR1, SCR2 of the lamp lighting control circuit 200 becomes zero.

FIG. 10 is a diagram showing the various waveforms in the event of continuity angle control of the thyristors in FIG. 9. FIG. 10($a$) shows the input voltage waveform to the lamp lighting device 100. FIG. 10($b$) is a diagram showing an example of the timing of the gate current flow to the gates G1, G2 of the thyristors SCR1, SCR2, in which (1) is the gate current for the first thyristor SCR1 and (2) is the gate current for the second thyristor SCR2. FIG. 10($c$) shows the waveform of the output current when the gate current flows with the timing from FIG. 10($b$). Now, in the case of filament lamp lighting devices, the output voltage has the same waveform as the output current.

Consequently, the output power from the lamp lighting device 100 is the product of the out current waveform and the output voltage waveform shown by the shaded area of FIG. 10($c$). By varying the timing of the gate current supplied to the thyristors SCR1, SCR2, it is possible to vary the output voltage waveform an output current waveform shown in FIG. 10($c$), and so light adjustment that varies the output power, which is the lamp input power, is possible.

(b) Zero Cross Control

FIG. 11 is a diagram showing the various waveforms in the event of zero cross control of the thyristors in FIG. 9. The structure of the control circuit is the same as FIG. 9, and the timing of the gate current to the thyristors SCR1, SCR2 is as shown in FIG. 11($b$). In the figure, (1) is the gate current for the first thyristor SCR1 and (2) is the gate current for the second thyristor SCR2.

FIG. 11($c$) shows the output current and output voltage when the gate current has the timing shown in FIG. 11($b$). As shown in FIG. 11($c$), the lamp input voltage is varied and light adjustment is carried out by means of intermittence of output current and output voltage waveforms.

However, the two control methods described above have the following problems.

(1) Occurrence of Transient Noise (Continuity Angle Control)

Figures 10A, 10B, 10C:
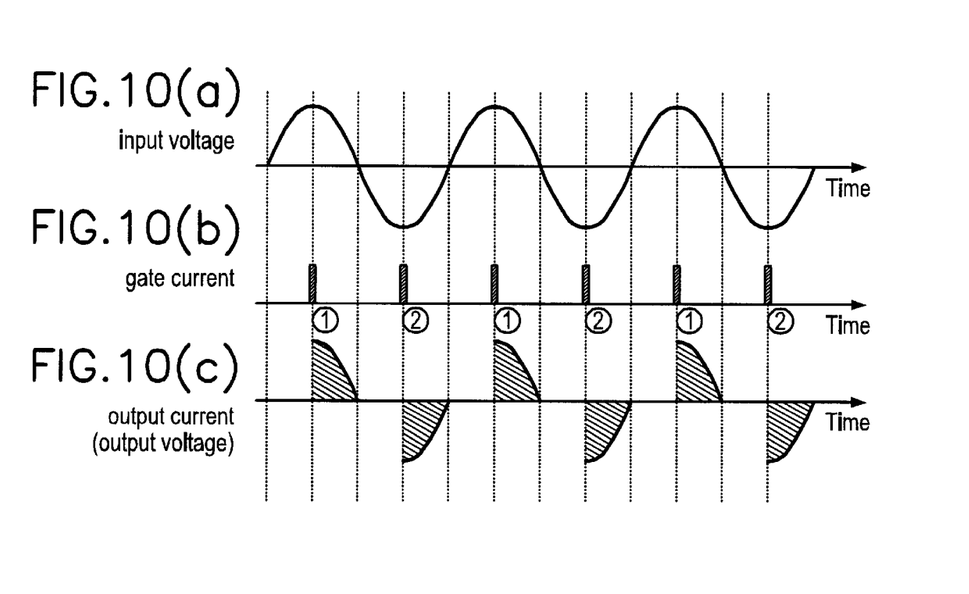
FIG. 10 is a diagram showing the waveforms of various parts during continuity angle control of the thyristors in FIG. 9.

In the continuity angle control method illustrated in FIG. 10, a high voltage is suddenly impressed on the lamp as shown in FIG. 10(c). Because of that, noise known as transient noise occurs within the lamp lighting device, and that sometimes causes the device control system to malfunction. And because of a rush current flow in the lamp filament, the filament is in a state of overload, which is liable to cause filament breakage.

(2) Drop in Response Speed; Lack of Constant Control (Zero Cross Control)

Figures 11A, 11B, 11C:
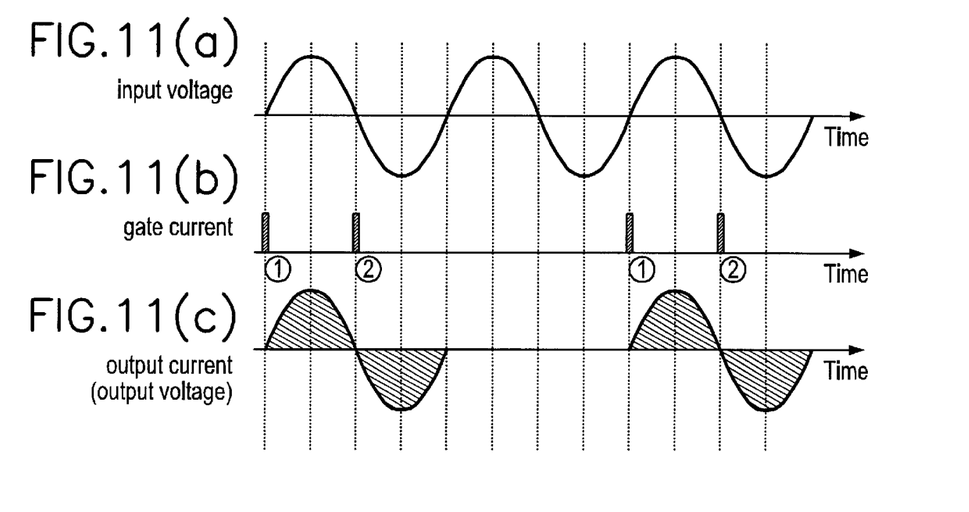
FIG. 11 is a diagram showing the waveforms of various parts during zero cross control of the thyristors in FIG. 9.

In the case of zero cross control, the voltage of the power source is sent through the thyristor at the time of the zero cross, so a high voltage is not impressed suddenly on the lamp. Nevertheless, the cycles of the commercial input frequency are thinned out as shown in FIG. 11(b) so the response time of the light adjustment cannot be faster than the frequency of the commercial power supply, and rapid light adjustment is not possible. Moreover, the output power cannot be varied continually, and so minute light adjustment is not possible.

(3) Occurrence of High-frequency Distortion

Figure 12A:
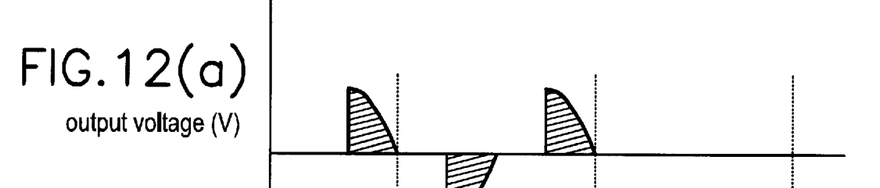
FIG. 12 is a diagram showing the input current, output current and voltage waveforms during continuity angle control and zero cross control.
Figure 12B:
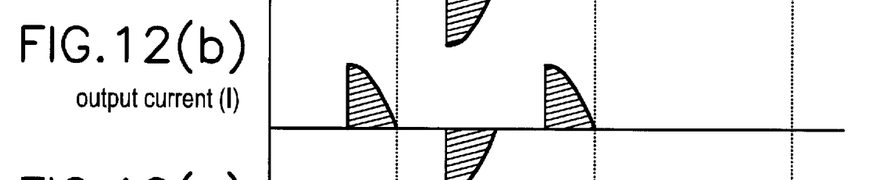

Taking the example of continuity angle control shown in FIG. 10, when the power control is done on the output side, as described above, the output voltage and output current are as shown in FIG. 12(a) and (b) respectively.

Figure 12C:
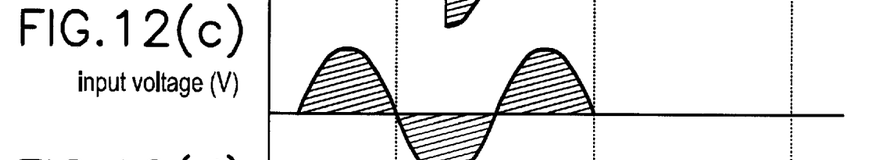
Figure 12D:
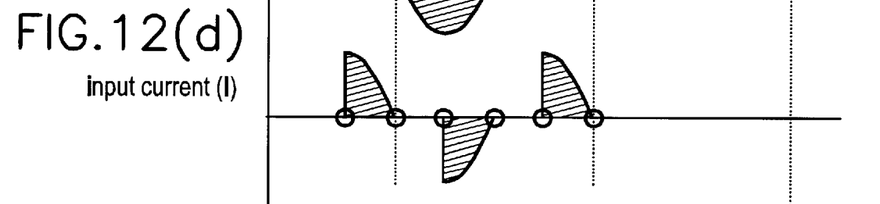

On the other hand, the waveform of the input voltage to the lamp lighting device 100 is the voltage waveform of the commercial alternating current power supply shown in FIG. 12(c). The waveform of the input current, moreover, is the same as the waveform of the output current, as shown in FIG. 12(d).

The following problem occurs when the input current has this kind of waveform. The parts of the waveform indicated by the circles in FIG. 12(d) are nonlinear, and that causes high-frequency distortion of the input current. This sort of high-frequency distortion is becoming the object of regulation.

Figure 12E:
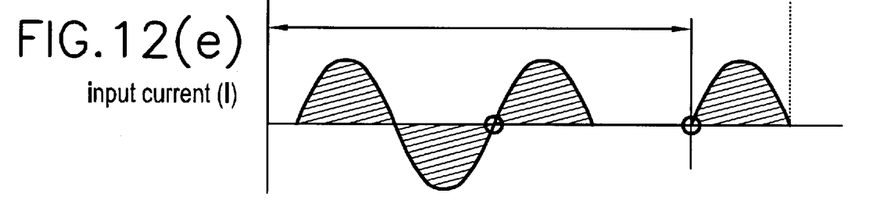

A similar problem occurs in the zero cross control illustrated in FIG. 11. The parts of the waveform indicated by the circles in FIG. 12(e) are nonlinear, and high-frequency distortion occurs.

(4) Occurrence of Reactive Power

In FIG. 12, input voltage is V and input current is I. When W is effective power and V×I is apparent power, the input voltage waveform and the input current waveform are both sine waves, and are in the following relationship unless there is a phase shift.

$$V \times I = W$$

W can be thought of as the output power (lamp input power).

However, in the case of a distorted waveform, as in FIG. 12(d), there is always reactive power (=V×I−W). Consequently, in the distorted waveform shown in FIG. 12(d), in order to output effective power W, it is necessary to supply an apparent power V×I that is greater than the sine wave.

Similarly in the case of zero cross control, reactive power occurs because the period shown by the arrows in FIG. 12(e) is considered one cycle.

This reactive power occurs as soon as the output power is controlled. This fact is a big problem when practical equipment is manufactured.

That is, for the reasons given below, the output power of the lamp lighting device 100 is always controlled, so there is necessarily reactive power in the lamp lighting device 100, which harms the efficiency of the lamp lighting device.

1) In practical terms, in equipment such as light irradiation heat treatment equipment, when there is, for example, a commercial 200 V input to the lamp lighting device, then considering a 10% voltage fluctuation it is common sense to use a lamp with a rated input voltage that is 10% lower, 180 V for example, to leave an adequate margin. Consequently, the power of the lamp lighting device is controlled even when lighting the lamp at the rated value.

2) In light irradiation heat treatment equipment, moreover, the lighting and light adjustment of multiple lamps may, depending on the lamps used, involve different ratings (different filament lengths). In this case as well, the output power is always controlled.

However, an alternating current chopper control method has been proposed as a method to resolve this problem of reactive power. The alternating current chopper control method is one which controls the output voltage (current) by chopping the input voltage (current) with a switching circuit. By controlling the ON period in the switching operation, it is possible to control the output voltage (output current).

Parts of the waveform when the alternating current chopper control method is in use is shown in FIG. 13.

Figure 13A:
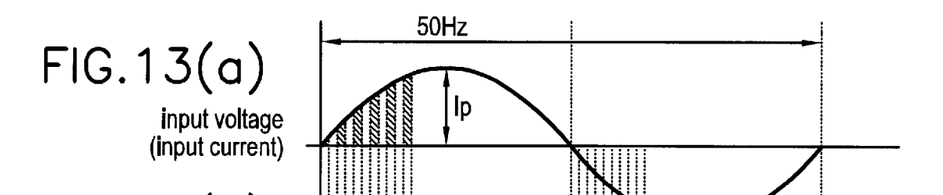
FIG. 13 is a diagram showing the waveforms of various parts during use of the alternating current chopper control method.
Figure 13B:
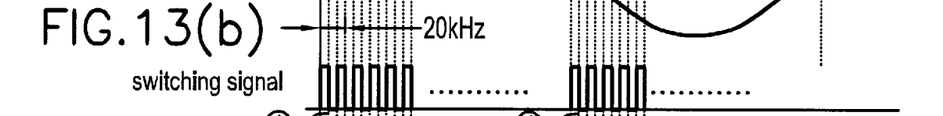
Figure 13C:
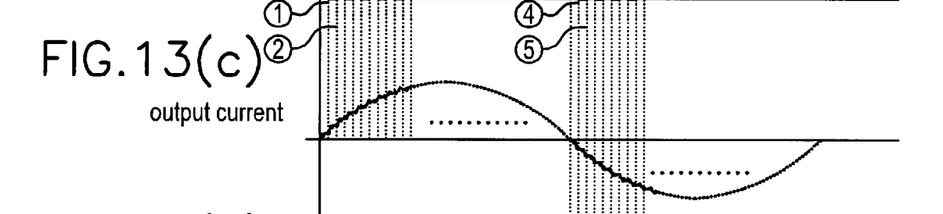

That is, the input voltage (current) shown in FIG. 13(a) is turned ON/OFF by the switching signal shown in FIG. 13(b), yielding the output current shown in FIG. 13(c). Now, the figure shows a duty cycle of about 50%. In the constitution used here, the switching circuit used for commutation is in parallel with the load, and the inductance is in series with the filament lamp, so when the switching circuit connected in series with the input side is off, the switching circuit for commutation is on, and the output current flows continuously through the commutation circuit.

Figure 13D:
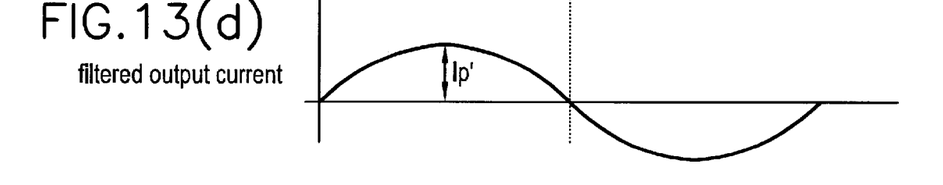

With the waveform shown in FIG. 13(c), if the frequency of the switching signals is increased, the waveform becomes closer to a sine wave, and by applying further filtering to the output current shown in FIG. 13(c), it is possible to obtain the sinusoidal output shown in FIG. 13(d). The input current can also be made sinusoidal by passing it through a low-pass filter.

Using the alternating current chopper control method described above, it is possible to have sinusoidal input and output waveforms and, since the phase of the voltage and current is the same, there is no problem of reactive power.

Moreover, since there is no sudden rise of output current, the problem of rise noise does not occur, and by controlling the duty cycle of the switching signals, rapid and minute light adjustment is possible.

As stated above, in a lamp lighting device that controls the heat generated by a filament lamp by varying the power input to the lamp, it is necessary to vary the output power so as to not impress voltage on the lamp suddenly (to avoid producing noise and to avoid a large rush current to the lamp), and so as to enable continuous light adjustment with a rapid response time. It is also necessary to vary the output current such that there is no high-frequency distortion of the input current and no reactive power.

When the alternating current chopper control method described above is used, it is possible to make the output current, output voltage and input current waveforms sinusoidal, and so continuous light adjustment with a rapid response time is possible with no occurrence of reactive power and without large rush currents being passed suddenly to the lamp.

Nevertheless, the alternating current chopper control method does cause high-frequency distortion of the input current unless there is a filter circuit on the input side since, as shown in FIG. 13, the switching signals shown in FIG. 13(b) turn the input voltage (current) ON and OFF.

In light irradiation heat treatment equipment, in particular, light adjustment of multiple filament lamps is necessary and the input current to be switched is large, so high-frequency distortion has a great effect on the power supply side.

This invention was made in consideration of the situation described above. It provides a filament lamp lighting device that has an alternating current power supply connected to the input side and lights multiple filament lamps by controlling its output power, in which either there is no need for a filter circuit to eliminate high-frequency distortion on the input side, or it can be miniaturized so that the power supply side is unaffected by high-frequency distortion.

SUMMARY OF THE INVENTION

In this invention, the problems described above are resolved in the following way.

In a filament lamp lighting device that has an alternating current power supply connected to the input side and lights multiple filament lamps by controlling its output power, in which there is a lighting control circuit to respond to each of multiple filament lamps, as well as a controller to control those lighting control circuits.

These lighting control circuits contain switching elements that switch either the sinusoidal current provided by the alternating current power supply or a fully rectified current. When this switching element is ON, input current is supplied to the filament lamp; when the switching element is OFF, current continues to flow to the filament lamp by means of energy stored in an inductance element connected in series with the filament lamp. Subsequent alternation of the ON and OFF states supplies the filament lamp with output current with roughly the same shape as the input current waveform.

Moreover the controller, by varying the duty cycle of the ON/OFF signals of the switching elements, varies the peak values of the output current and also provides the lighting control circuits with ON/OFF signals having staggered timing.

In this invention, the ON/OFF signals provided to the individual lighting control circuits have staggered timing, as mentioned above, and so either there is no need for filter circuits or they can be miniaturized, the waveform of the input current within the filament lamp lighting device as a whole can be made sinusoidal, and there is no effect of high-frequency distortion on the power supply side. For this reason it is possible to simplify the constitution of the equipment and to reduce costs.

DETAILED DESCRIPTION OF THE INVENTION

Figure 1:
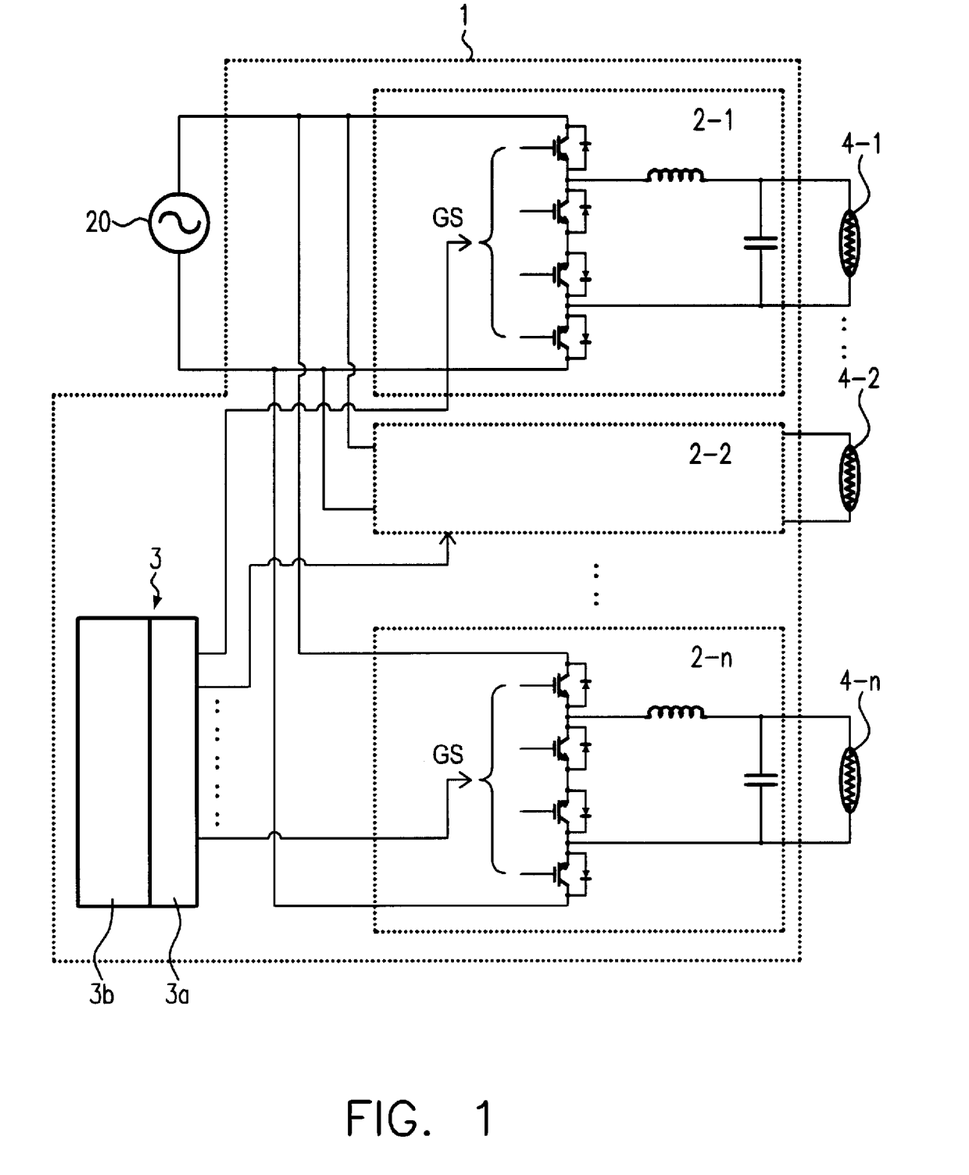
FIG. 1 is a diagram showing the constitution of the filament lamp lighting device of the first implementation of this invention.

FIG. 1 is a diagram showing the constitution of the filament lamp lighting device of the first implementation of this invention.

In the drawing, 1 is the lamp lighting device, 20 is an alternating current power supply, and 2-1 through 2-n are lighting control circuits. The switching elements of lighting control circuits 2-1 through 2-n are controlled by gate signals from the controller 3, and light adjustment of filament lamps 4-1 through 4-n is accomplished by controlling the alternating current inputs fed from the alternating current power supply 20.

The controller 3 comprises a gate signal generation circuit 3a that supplies gate signals GATE SIGNAL to the switching elements of the lighting control circuits 2-1 through 2-n, and a CPU 3b. Based on the output of the CPU 3b, the gate signal generation circuit 3a generates the switching signals shown in FIG. 13(b), and turn ON or OFF the switching elements of the lighting control circuits 2-1 through 2-n.

The operation of the lamp lighting control circuits shown in FIG. 1 is explained next.

Figure 2:
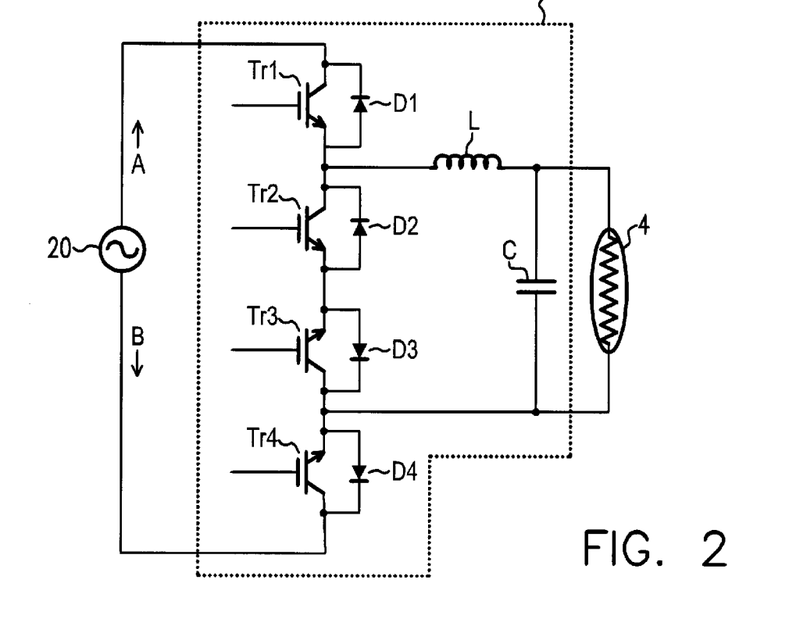
FIG. 2 is a diagram showing the constitution of the lamp lighting control circuit of the first implementation of this invention.

FIG. 2 is a diagram showing the constitution of an lamp lighting control circuit of the implementation shown in FIG. 1; it shows one lamp lighting control circuit extracted from those shown in FIG. 1. In the drawing, 2 is a lighting control circuit, 20 is the alternating current power supply, Tr1 through Tr4 are switching elements, D1 through D4 are diodes, Cis a condenser, L is an inductance, and 4 is a filament lamp (hereafter abbreviated as "lamp").

The switching elements Tr1 through Tr4 are turned ON and OFF with a certain drive frequency, as shown in FIG. 13, by gate signals generated by the gate signal generation circuit 3a shown in FIG. 1. Some high frequency, such as 20 kHz, is chosen for this drive freeqency. If this frequency is too low, the capacity of the condenser C on the output side becomes too large, and a sound may be produced. If it is too high, on the other hand, the efficiency of the switching elements deteriorates. It is better to set an appropriate frequency between the two.

The lamp lighting control circuit 2 in FIG. 2 operates as follows.

Figure 3:
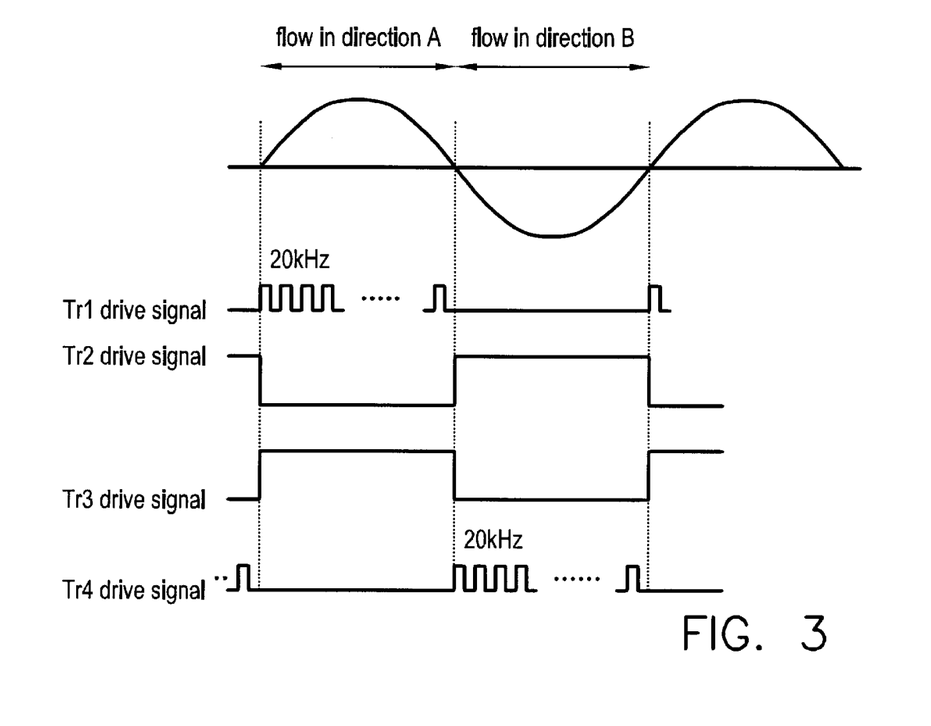
FIG. 3 is a diagram to explain the gate signals that drive the switching elements of the lighting control circuits.

Commercial alternating current power supply is fed from the alternating current power supply 20 to the lamp lighting control circuit 2. Sometimes the input current flows in the direction A of FIG. 2, and sometimes in the direction B. In either case, the switching elements are controlled as shown in FIG. 3.

(1) When the Input Current Flows in the Direction A

1) The first and third switching elements Tr1, Tr3 are turned ON and the other switching elements Tr2, Tr4 are OFF. The output current flows from the first switching element Tr1→inductance L→Lamp 4→fourth diode D4.

2) While the third switching element Tr3 remains ON, the first switching element Tr1 is turned OFF and the other switching elements Tr2, Tr4 remain OFF. The residual current in the inductance 2 flows from the inductance L→lamp 4→third switching element Tr3→second diode Discharge vessel 2→inductance L.

3) The switching combinations of 1) and 2) above are repeated.

(2) When the Input Current Flows in the Direction B

4) The second and fourth switching elements Tr2, Tr4 are turned ON and the other switching elements Tr1, Tr3 are OFF. The output current flows from the fourth switching element Tr4→Lamp 4→inductance L→first diode D1.

5) While the second switching element Tr2 remains ON, the fourth switching element Tr4 is turned OFF and the other switching elements Tr1, Tr3 remain OFF. The residual current in the inductance L flows from the inductance L→second switching element Tr2→third diode Discharge concentrator 3→lamp 4→inductance L.

6) The switching combinations of 4) and 5) above are repeated.

By means of the control described above, the waveform of each part of the lamp lighting control circuit 2 conforms to that shown in FIG. 13. Now, in this example the lamp lighting control circuit 2 had input from a 50 Hz commercial alternating current power supply, and the switching frequency of switching elements Tr1 and Tr4 was 20 kHz.

When the input voltage waveform is the waveform shown in FIG. 13(a), and the switching duty cycle is about 50%, the switching signal will be as in FIG. 13(b). What is marked (1) in the figure corresponds to the circuit operation in (1)1) above, and (2) corresponds to the operation in (1)2). Similarly, (4) and (5) correspond to the circuit operations in (2)4) and 5).

By means of the switching described above, the output current waveform of the lamp lighting control circuit 2 is made to conform with that in FIG. 13(c).

That is, during (1) in FIG. 13(b), the current from the commercial alternating current power supply is output as it is, and the lamp current value increases gradually. And when the switch is made to (2) of FIG. 13(b), the output side is cut off from the commercial alternating current power supply, but because of the residual current in the inductance L, the current flowing to the lamp 4 decreases gradually. If the operation (1) resumes before the residual current has reached zero, the output current increases again. The same is true of (4) and (5).

Now, for the purpose of explanation, the irregularities in FIG. 13(c) have been exaggerated, but in reality, if the switching is done at 20 kHz, for example, the irregularities are very small, and the output waveform will be sinusoidal even without a filter circuit on the output side. If the necessity does exist, a clean sine wave as shown in FIG. 13(d) can be achieved by flattening irregularities with a condenser C on the output side.

The ratio of times (1):(2) (or (3):(4)) is called the duty cycle. If the duty cycle were 1, then only circuit operation (1) would transpire, and the input waveform going to the lamp would be the same as the waveform input to the lamp lighting device; if the duty cycle were 0, there would only be circuit operation (2), and there would be zero input to the lamp.

Consequently, by varying the switching duty cycle between 0 and 1, it is possible to obtain an output current with a sinusoidal waveform, with the peak value varying in the range $0 \leq$(peak output current Ip')$\leq$(peak input current Ip). That is, it is possible to supply a continuously variable current to the lamp 4.

On the other hand, because the waveform of the input current to the lamp lighting control circuit 2 is repeatedly turned ON/OFF in accordance with the duty cycle of the switching element, it becomes as in FIG. 13(a) (see the shaded parts in the drawing).

As shown in FIG. 13(a), because the switching is at 20 kHz, the input current to the lamp lighting control circuit 2, has great high-frequency distortion.

Therefore, the following was done to the switching control of each lamp lighting control circuit in this implementation, to reduce the high-frequency distortion on the input side.

Figure 4:
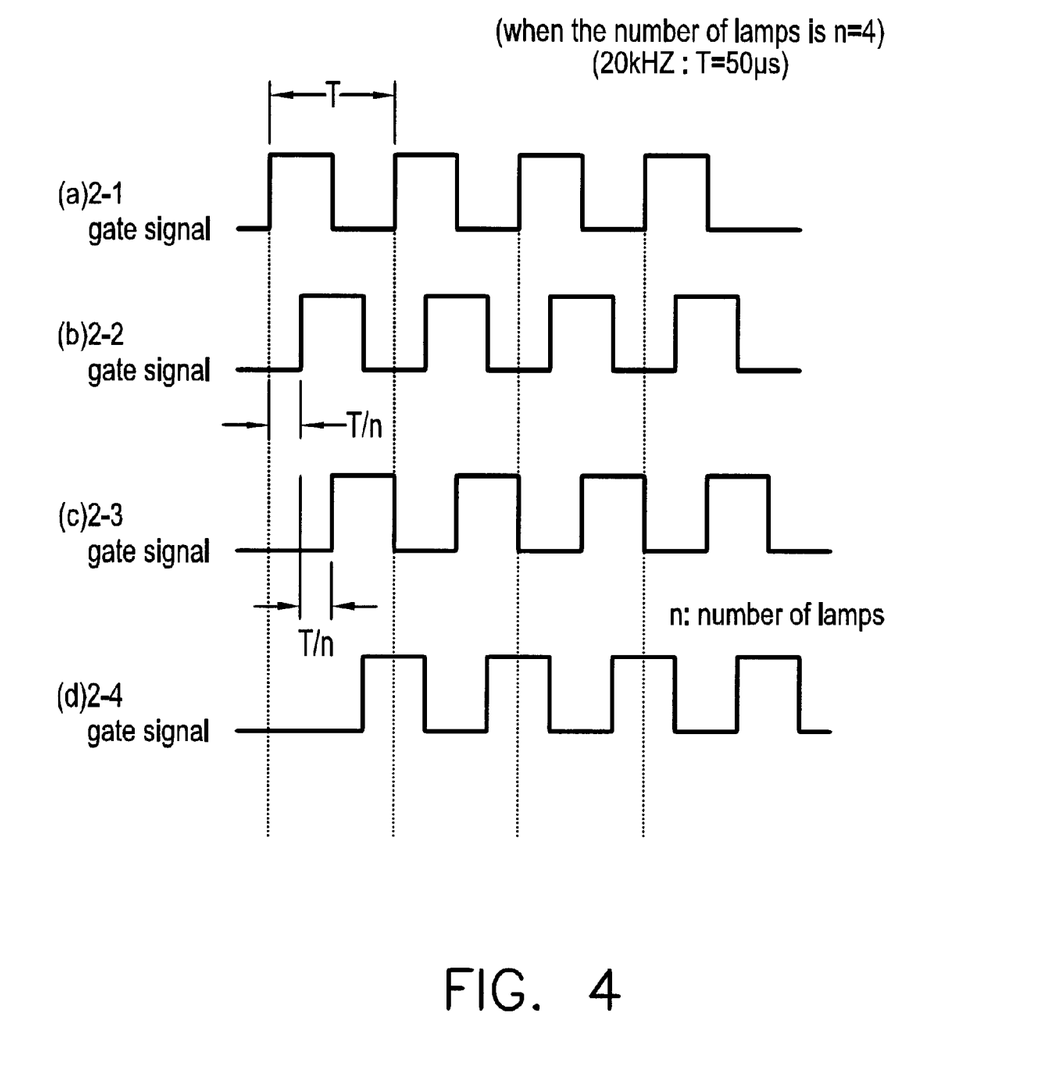
FIG. 4 is a diagram showing an example of the timing of gate signals provided to lighting control circuits 2-1 through 2-n.

FIG. 4 is a diagram showing the gate signals of lamp lighting control circuits 2-1 through 2-n. The drawing shows the case of n=4.

As shown in the drawing, in this implementation the cycle time T is divided by the number of lamps, and the switching elements Tr1 through Tr4 of the lamp lighting control circuits 2-1 through 2-n that output to their lamps are operated in order with that time differential.

Taking as an example the case of lighting four lamps with a switching frequency of 20 kHz, there is one lamp lighting control circuit for one lamp, and so there are four lamp lighting control circuits, from 1 through 4. In this case, a 20 kHz cycle (cycle length 50 µs) is divided by 4, and the gate signal time differential is 12.5 µs.

FIG. 5 is a diagram showing the input current waveform when multiple lamp lighting control circuits are operated by gate signals having a time differential like that described above.

Figures 5A, 5B, 5C, 5D, 5E:
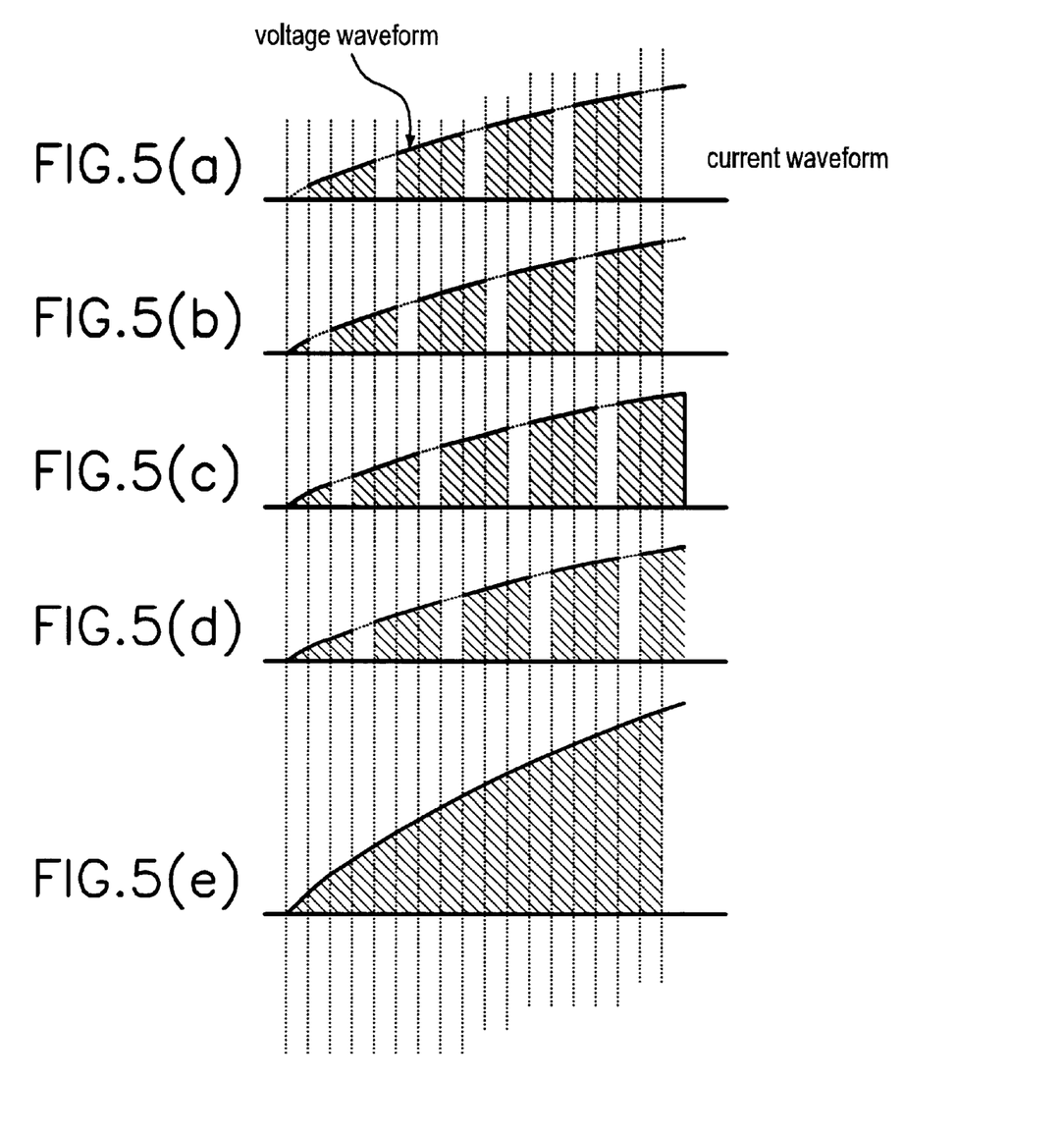
FIG. 5 is a diagram showing the input current waveform when multiple lighting control circuits are operated by gate signals with a time differential.

In the drawing, when the lamp lighting control circuit 2-1 for light adjustment of the lamp 4-1 is switched by gate signals, the switching elements operate with a certain duty cycle, and the input current waveform of the lamp lighting control circuit 2-1 is as shown in FIG. 5(a).

Then, when the switching element of lamp lighting control circuit 2-2 operates 12.5 µs after the operation of lamp lighting control circuit 2-1, the input current waveform of the lamp lighting control circuit 2-2 is as shown in FIG. 5(b).

Similarly, when the operation moves in order to the lamp lighting control circuit 2-3 and then lighting control circuit 2-4, the input current waveforms are as in FIG. 5(c) and (d).

Putting together the current waveforms of FIG. 5(a) through (d) produces the input current waveform for the lamp lighting device as a whole when lighting multiple lamps. This is the sine wave shown in FIG. 5(e).

For example, if n=4 and the duty cycle is 10%, the input current would not be sinusoidal, but the frequency of the input current would be 80 kHz, and the maximum current value would not increase, so it would be possible to obtain a sine wave using a small filter circuit.

Figures 6A, 6I:
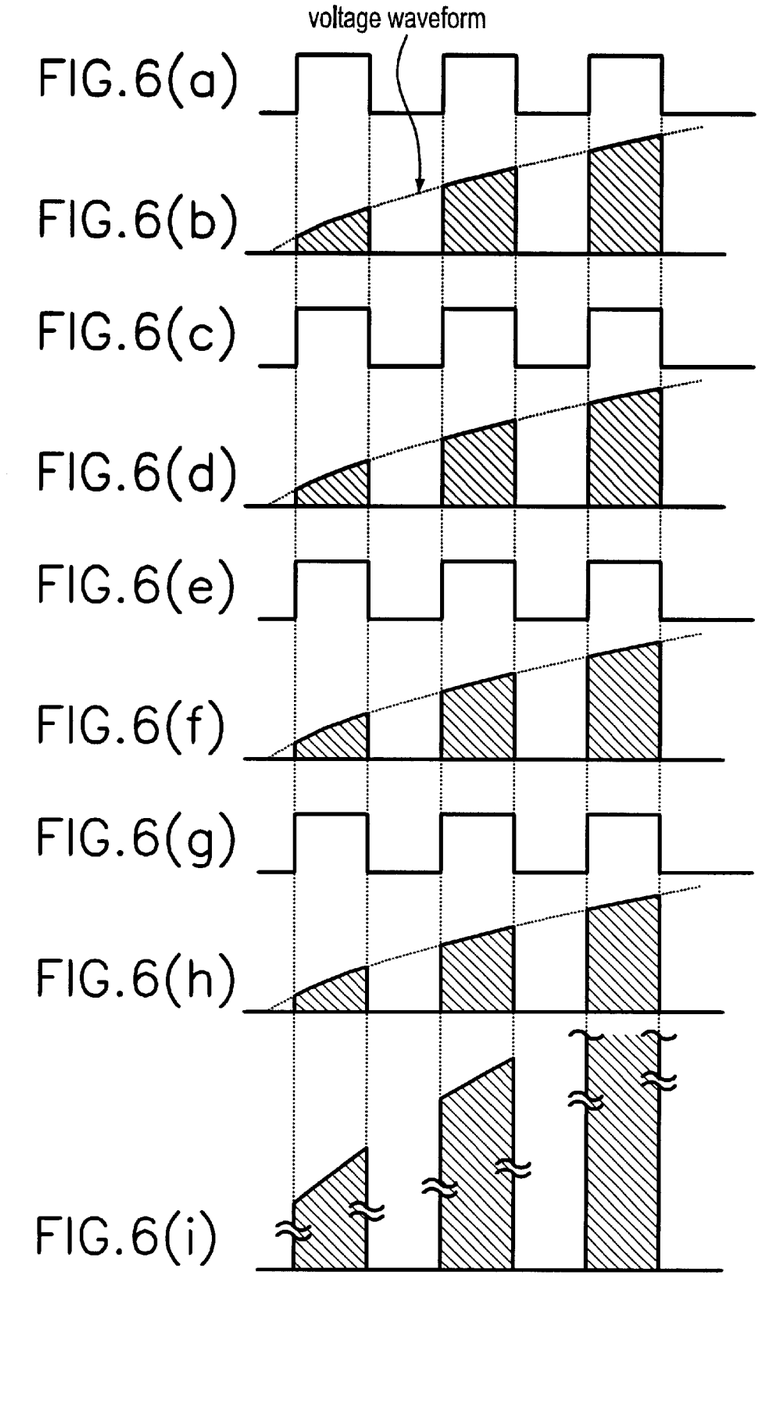
FIG. 6 is a diagram showing the input current waveform when multiple lamps are lighted by switching with the same timing and the same duty cycle.

FIG. 6 is the input current waveform in the event that multiple lamps are lighted by switching with the same timing and the same duty cycle. In the drawing, (a), (c), (e) and (g) show the gate signals of the lamp lighting control circuits 2-1 through 2-4 for light adjustment of the lamps 4-1 through 4-4, and (b), (d), (f) and (h) show the input current waveforms of lamp lighting control circuits 2-1 through 2-4. FIG. 6(i) shows the input current (total) to the lamp lighting control circuits.

In this case, the current values are overlapped as shown in the drawing, and the high-frequency distortion on the power supply side are quite great. For that reason it is necessary to have a filter circuit that can cope with large current values and filter. The wave induces 20 kHz high-frequency distortion that is a factor that makes the equipment larger and increases costs.

Figure 7:
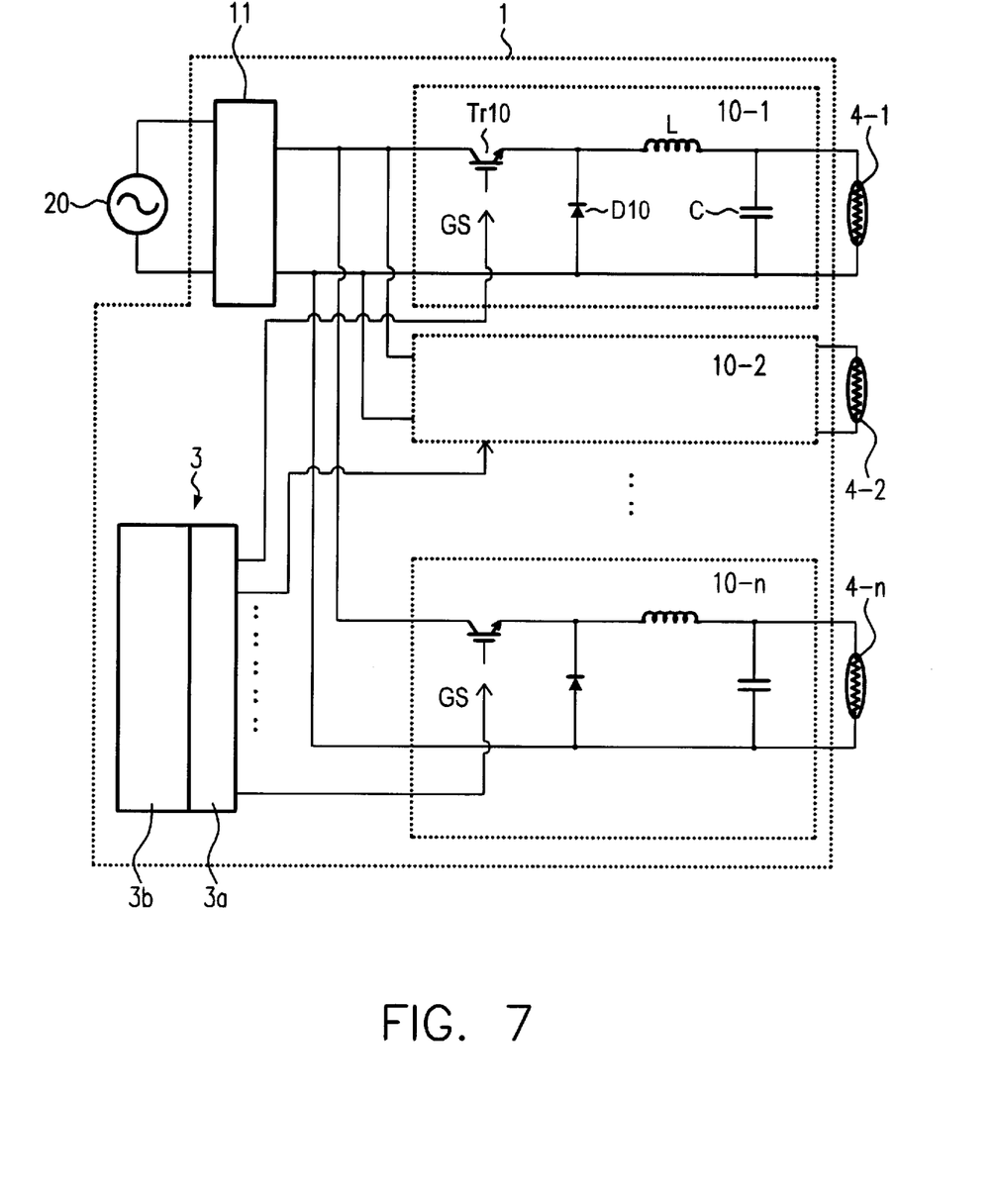
FIG. 7 is a diagram showing the constitution of the lamp lighting device of the second implementation of this invention.

FIG. 7 is a diagram showing the constitution of the lamp lighting device of the second implementation of this invention.

In FIG. 7, 1 is the lamp lighting device, 10-1 through 10-n are the lamp lighting control circuits, 20 is the alternating current power supply, 11 is the full-wave rectification circuit, Tr10 is the switching element, D10 is a diode, L is an inductance, C is a condenser, 4 is a filament lamp, 3 is a controller, 3a is a gate signal generation circuit, and 3b is a CPU.

The switching element Tr10 in this drawing is turned ON/OFF at a certain drive frequency by gate signals GATE SIGNAL generated by gate signal generation 3a. As in the first implementation, some high frequency, such as 20 kHz, is chosen for this drive frequency.

In FIG. 7, the lamp lighting control circuits operate as follows.

FIG. 8 is a diagram showing the waveforms of parts of the lighting control circuits 10-1 through 10-n of this implementation. The operation of the lamp lighting control circuits of this implementation will be explained with reference to this drawing.

Figures 8A, 8D:
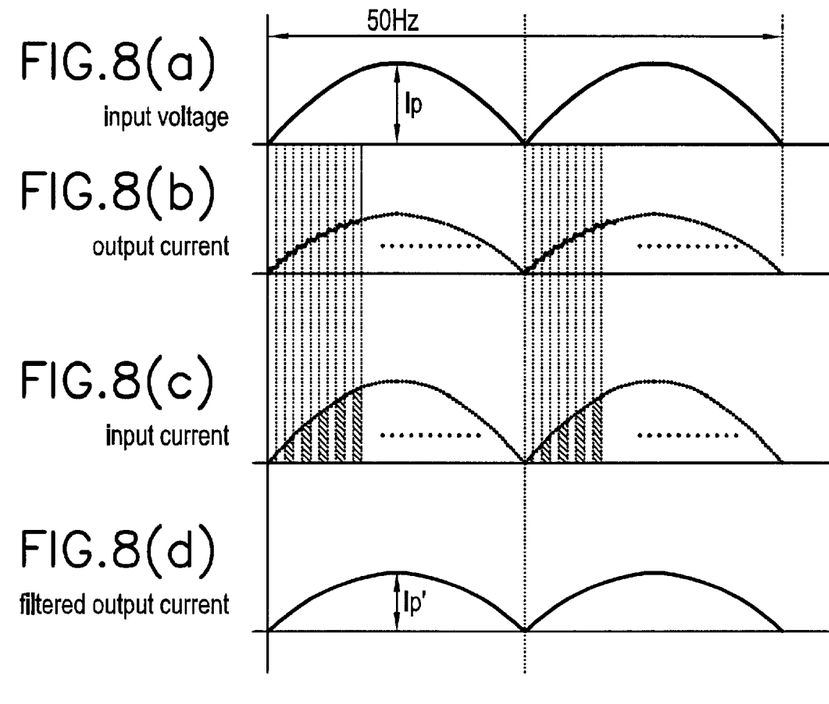
FIG. 8 is a diagram showing the waveforms of parts of the lighting control circuit of the second implementation.

Commercial alternating current power supply is fed from the alternating current power supply 20. The input current is fully rectified by the full-wave rectification circuit 11, and the fully rectified voltage is supplied to the switching element Tr10 as shown in FIG. 8(a).

1) The switching elements Tr10 is fed an ON signal from the controller 3, at which point the output current flows from the full-wave rectification circuit 11→switching element Tr10→inductance L→Lamp 4→full-wave rectification circuit 11.

2) When first switching element Tr1 is turned OFF, the residual current in the inductance L flows from the inductance L→lamp 4→diode D10 inductance L.

3) The switching combinations of 1) and 2) above are repeated.

By means of the control described above, the waveforms of each part of the lamp lighting control circuits 10-1 through 10-n conform to that shown in FIG. 8. Now, in this example the lamp lighting control circuit 2 had input from a 50 Hz commercial alternating current power supply, and the switching frequency of switching elements Tr1 through Tr4 was 20 kHz.

When the input voltage waveform is the waveform shown in FIG. 8(a), and the switching duty cycle is about 50%, the switching signal will be as in FIG. 8(b).

That is, when the switching element Tr10 is turned ON, the current from the commercial alternating current power supply is output as it is, and the lamp current value increases gradually. And when the switching element Tr10 is turned off, the output side is cut off from the full-wave rectification circuit 11, but because of the residual current in the inductance L, the current flowing to the lamp 4 decreases gradually. If this Tr10 is turned ON again before the residual current has reached zero, the output current increases again.

Now, for the purpose of explanation, the irregularities in FIG. 8(b) have been exaggerated, but in reality, if the switching is done at 20 kHz, for example, the irregularities are very small, and the output waveform will be sinusoidal even without a filter circuit on the output side. If the necessity does exist, a clean sine wave as shown in FIG. 8(d) can be achieved by flattening irregularities with a condenser C on the output side.

Consequently, by varying the switching duty cycle of switching element Tr10 between 0 and 1, it is possible to obtain an output current with a sinusoidal waveform, with the peak value varying as described above. That is, it is possible to supply a continuously variable current to the lamp 4.

On the other hand, because the waveform of the input current to the lamp lighting control circuit 10 is repeatedly turned ON/OFF in accordance with the duty cycle of the switching element Tr10, it becomes as in FIG. 8(c); the input current to the lamp lighting control circuit has a waveform with great high-frequency distortion.

Therefore, in this implementation as in the first implementation, the timing of the switching control of the lamp lighting control circuits was staggered to reduce the high-frequency distortion on the input side.

That is, as shown in FIG. 4, the switching frequency is divided by the number of lamps, and the switching elements Tr10 of the lamp lighting control circuits 10-1 through 10-n that output to their lamps are operated in order with that time differential.

Taking as an example the case of lighting four lamps with a switching frequency of 20 kHz, there is one lamp lighting control circuit for one lamp, and as described above, a 20 kHz cycle (cycle length 50 µs) is divided by 4, and the gate signal time differential is 12.5 µs.

If multiple lamp lighting control circuits 10-1 through 10-n are operated by gate signals having a time differential like that described above, then as explained in FIG. 5, when the multiple lamps are lit, the output current waveform from the full-wave rectification circuit 11 is a fully rectified waveform, and the waveform of the alternating current input current of the lamp lighting device as a whole is a sine wave.

In this implementation, as stated above, a fully rectified waveform with variable peak values can be obtained by switching of a fully rectified waveform by means of the lamp lighting control circuit, and by that means the lamps can be lighted. Therefore, it is possible to achieve the same effect as in the first implementation, without suddenly impressing a high voltage value on the lamps as in the case of continuity angle control.

Moreover, it is possible to constitute a lamp lighting control circuit with a single switching element, and thus to simplify the circuitry.

In addition, because the output current drops to a near-zero value at every half cycle of alternating current input, there is no sustained arc like that in the case of direct current lighting to cause filament breakage.

As explained above, the following effects can be achieved through this invention.

(1) The output current and output voltage waveforms are sinusoidal and the height of the peak value can be varied, so that it is possible to vary the output power and control the heat output of multiple filament lamps.

Because the voltage is not suddenly impressed on the lamps, no noise is produced. There is no rush current flow to the filaments, and so lamp life is prolonged. By varying the duty cycle of the switching elements it is possible to vary the peak value continuously and instantly, and so the brightness of the lamps can be varied continuously and instantly.

(2) Because the timing of the ON/OFF signals fed to the multiple lighting control circuits is staggered, a filter circuit to eliminate high-frequency distortion on the input side is unnecessary or can be made very small, and it is still possible to make the input current waveform sinusoidal. For that reason, it is possible to simplify the constitution of the equipment, and reduce costs.

Further, due to the lighting control circuit there is no ineffective output. Therefore, it is possible to obtain a lamp lighting device with high efficiency.

FIELD OF INDUSTRIAL USE

The filament lamp lighting device of this invention is used in heat treatment and illumination, and particularly for light irradiation heat treatment equipment for semiconductor wafers.

What is claimed is:

1. A filament lamp lighting device that has an alternating current power supply connected to an input side and lights multiple filament lamps by controlling output power from the power supply, said filament lamp comprising: a lighting control circuit for each of multiple filament lamps, each lighting control circuit having a switching element for switching input current that is either sinusoidal current from the power supply or fully rectified input current; and a controller to control the lighting control circuits, wherein the lighting control circuits contain switching elements that supply input current to the filament lamps when the respective switching element is in an ON state and residual energy stored in an inductance element connected in series to the filament lamp when the switching element is in an OFF state, and continue to supply the filament lamps with output current by repetition of the ON and OFF states, thus generating nearly the same output current waveform as the input current waveform, and wherein the controller varies the duty cycle of ON/OFF signals of the switching elements to vary the peak value of the output current and provide the lighting control circuits with ON/OFF signals having staggered timing.

* * * * *